(12) United States Patent
Kalhan

(10) Patent No.: US 8,180,343 B2
(45) Date of Patent: May 15, 2012

(54) DETECTION OF WIRELESS COMMUNICATION DEVICES IN SYSTEMS HAVING CELLS WITH DIFFERENT PILOT SIGNAL FREQUENCIES

(75) Inventor: Amit Kalhan, La Jolla, CA (US)

(73) Assignee: KYOCERA Corporation, Kyoto (JP)

( * ) Notice: Subject to any disclaimer, the term of this patent is extended or adjusted under 35 U.S.C. 154(b) by 424 days.

(21) Appl. No.: 12/393,564

(22) Filed: Feb. 26, 2009

(65) Prior Publication Data

US 2010/0216461 A1 Aug. 26, 2010

(51) Int. Cl.
*H04W 4/00* (2009.01)
*H04B 7/00* (2006.01)

(52) U.S. Cl. .................. 455/434; 455/515; 370/331

(58) Field of Classification Search .................. 455/434, 455/515; 370/331
See application file for complete search history.

(56) References Cited

U.S. PATENT DOCUMENTS

| | | | |
|---|---|---|---|
| 6,810,252 | B1 | 10/2004 | Kwon |
| 2009/0098873 | A1* | 4/2009 | Gogic ......................... 455/436 |
| 2009/0129341 | A1* | 5/2009 | Balasubramanian et al. 370/331 |
| 2009/0264077 | A1* | 10/2009 | Damnjanovic ............... 455/63.1 |
| 2009/0312024 | A1* | 12/2009 | Chen et al. .................... 455/437 |
| 2010/0151858 | A1* | 6/2010 | Brisebois et al. ............. 455/434 |
| 2011/0026492 | A1* | 2/2011 | Frenger et al. ................ 370/331 |
| 2011/0065438 | A1* | 3/2011 | Bergman et al. ............. 455/436 |

* cited by examiner

*Primary Examiner* — Marivelisse Santiago Cordero
*Assistant Examiner* — Jean Chang

(57) ABSTRACT

An originating transceiver node sends a search message to an alternate transceiver node in response to receiving a pilot signal report message from a wireless communication device detecting a pilot signal from a detected transceiver node. The wireless communication device detects a strong pilot signal transmitted from the detected transceiver node at the same frequency used for the pilot signal transmitted by the originating transceiver node. The alternate transceiver node transmits a pilot signal at a second frequency. The pilot signal report message allows the originating transceiver node to determine at least an approximate location of the wireless communication device and to identify the alternate transceiver node as a transceiver node at least potentially able to provide wireless service to the wireless communication device. In response to the search message, the alternate transceiver node searches for uplink signals associated with a pilot signal having the first frequency. If uplink signals transmitted from the wireless communication device are detected by the alternate base station, a determination is made whether handoff to the alternate transceiver node should be performed. In some situations, the originating transceiver node may transmit a change uplink format message to the wireless communication device where the new uplink format increases the likelihood of detection of the uplink signals by the alternate transceiver node.

10 Claims, 7 Drawing Sheets

DETECTION OF WIRELESS COMMUNICATION DEVICES IN SYSTEMS HAVING CELLS WITH DIFFERENT PILOT SIGNAL FREQUENCIES

BACKGROUND

The invention relates in general to wireless communication systems and more specifically to detection of wireless communication device in systems having cells with different pilot signal frequencies.

Wireless communication systems may include transceiver nodes, sometimes referred to as base stations or access nodes, to establish communication links to portable wireless communication devices. Each transceiver node transmits a pilot signal which is received by a wireless communication device. Pilot signals assist the wireless communication devices in communicating with the transceiver nodes. A pilot signal may be a dedicated single frequency carrier or may be a dedicated channel that is a portion of a carrier. For example, a pilot signal may be one or more time slots at a particular frequency spread by a particular code. In order to receive wireless service from a particular transceiver node, the wireless communication device must adequately receive the pilot signal transmitted by the transceiver node. In order to be handed off to a new transceiver node, a wireless communication device must first receive the pilot signal transmitted by the transceiver node. The wireless communication device, at least occasionally, searches for new pilot signals while communicating with a transceiver node. Often a wireless communication device includes a list of pilot signals that can be searched. Such a list may include pilot frequencies, PN offsets, and other information identifying a pilot signal corresponding to a transceiver node that may be available for providing wireless service to the wireless communication device.

SUMMARY

An originating transceiver node communicates with a wireless communication device that is transmitting uplink signals at an uplink frequency associated with a first pilot signal frequency of the first pilot signal transmitted by the originating transceiver node. The originating transceiver node sends a search message to an alternate transceiver node that is transmitting a second pilot signal at a second pilot signal frequency. The search message comprises information indicating that the wireless communication device is transmitting uplink signals at the uplink frequency. In response to the search message, the alternate transceiver node searches for the uplink signals at the uplink frequency. In some circumstances, the transmission of the search message is in response to the determination that there is at least a minimum likelihood that the wireless communication device is within a maximum proximity of the alternate transceiver node.

The determination may be based on a pilot signal report received from the wireless communication device indicating that the wireless communication device has detected a pilot signal at a first frequency transmitted from a detected transceiver node having coverage area overlapping or at least near an alternate transceiver node location. In some situations, the originating transceiver node transmits a change uplink format message to the wireless communication device where the updated uplink format increases the likelihood of detection of future uplink signals transmitted by the alternate transceiver node using the updated uplink format.

DETAILED DESCRIPTION

Figure 1A:
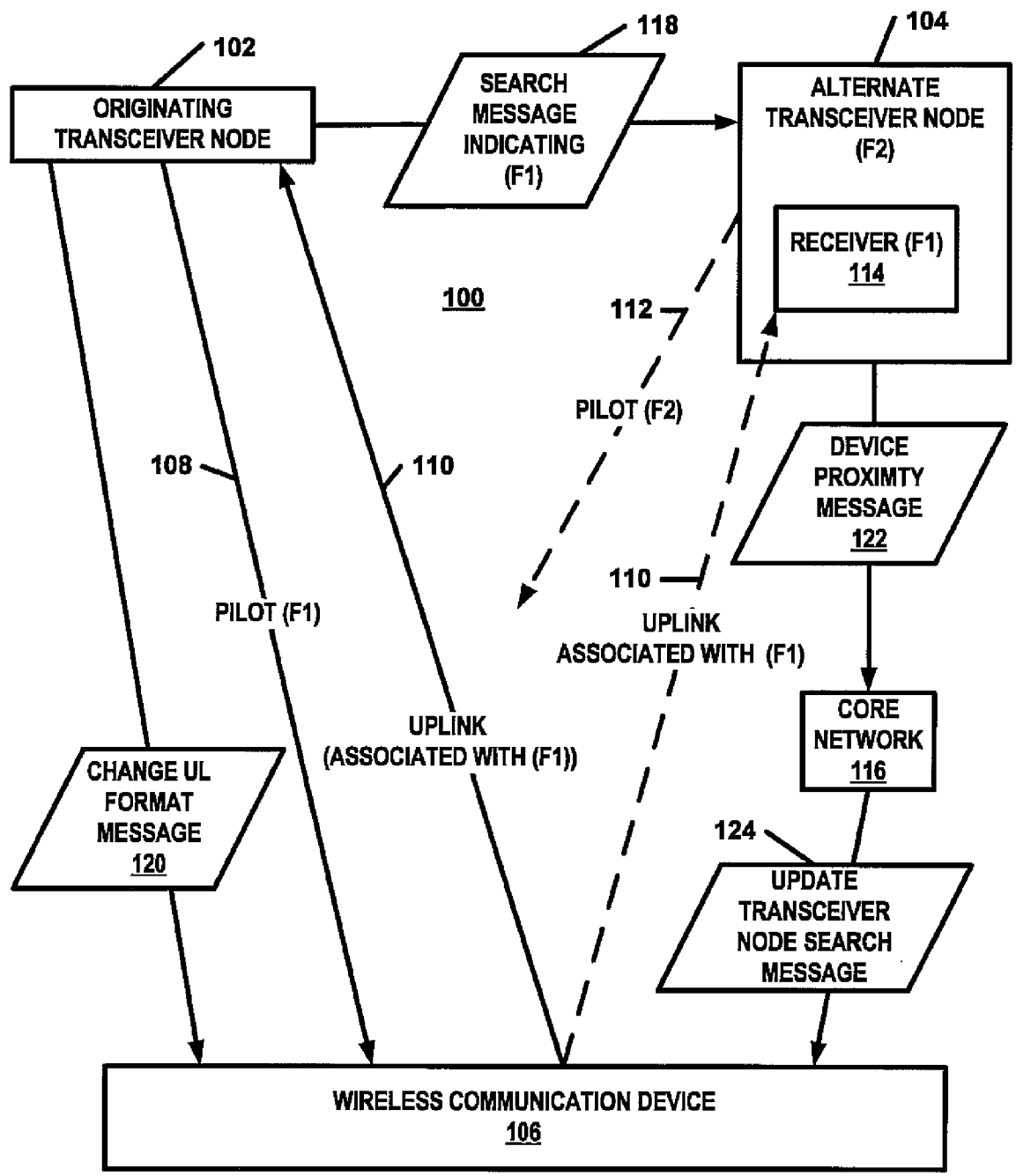
FIG. 1A is a block diagram of a communication system that includes at least an originating transceiver node, an alternate transceiver node and a wireless communication device.

As described above, wireless communication devices in many systems must receive the pilot signal transmitted from a transceiver node in order to acquire wireless service from the transceiver node. In conventional systems, the wireless communication device searches for pilot signals transmitted by transceiver nodes in order to find a transceiver node that will provide better service or at least can provide alternate service. Identifying available transceiver nodes facilitates handovers between cells which occurs when the wireless communication device is in motion and travels outside the current service cell. Handovers are also useful or required during other situations such as, for example, situations where a different level or different cost of service is desired, changes in transceiver node communication traffic, and changes in environmental conditions. Where a transceiver node is transmitting on a frequency different from the frequency used by the originating transceiver node from which the wireless communication device is currently receiving service, the wireless communication device must search the other frequency in conventional systems. This searching increases power consumption. In addition, frequency searches performed during the traffic state may result in degraded performance since resources are shared between searching and maintaining the communication traffic link. Advantages of the embodiments discussed herein include minimizing alternate frequency searches and improvement of handover success rates. Alternate transceiver nodes are identified as at least possibly being capable of providing service to the wireless communication device based on known or estimated locations of the wireless communications device and the alternate transceiver nodes. In some situations, the location of the wireless communication device is determined by conventional techniques such as Global Positioning System and/or triangulation techniques. In some situations, the location of the wireless communication device may be determined based on the identification of pilot signals that the wireless communication device is able to receive. For example, the location may be at least estimated when the wireless communication device reports a strong pilot signal from a neighboring cell. Advantages may be more easily realized within particular types of systems, configurations, and deployments. Systems employing Hierarchical Cell Structure (HCS) techniques, for example, may include smaller cells operating at frequencies different than the frequency of the larger cells. A transceiver node providing service within a large cell may apply information regarding the locations of the smaller cells and the location of the wireless communication device to identify small cell transceiver nodes that may be able to provide service to the wireless communication device. These small cell transceiver nodes are informed of the wireless communication device uplink frequency allowing the small cell transceiver nodes to search for the wireless communication device. If a wireless communication device is detected by one or more of the small cell transceiver nodes, the wireless communication device can be configured to search for the pilot signals of the small cell transceiver nodes. In accordance with some of the embodiments discussed herein, the wireless communication device reports the detection of a pilot signal of a transceiver node of a large cell other than the originating large cell from which the wireless communication device is receiving service. Based on the relationship between the locations of the other large cell transceiver node and a small cell transceiver node, the small cell transceiver node is identified as a candidate for providing service. The originating transceiver node provides notification of the wireless communication device to the alternate small cell transceiver node that is providing a small cell and operating at a different frequency. The alternate small cell transceiver node searches for uplink signals from the wireless communication device at the different frequency and initiates a procedure to allow the wireless communication device to locate the alternate small cell transceiver node when the uplink signals are detected.

FIG. 1A is a block diagram of a communication system 100 that includes at least an originating transceiver node 102, an alternate transceiver node 104 and a wireless communication device 106. For the examples, the wireless communication system 100 operates in accordance with 3rd Generation Partnership Project (3GPP) Long Term Evolution (LTE) standards and techniques. As is known, the LTE air interface utilizes Orthogonal Frequency-Division Multiple Access (OFDMA) in the downlink and Single-carrier FDMA (SC-FDMA) (DFTS-FDMA) in the uplink to efficiently support multi-antenna technologies such as multiple-input-multiple output (MIMO) schemes. Other standards, modulation schemes, protocols and communication techniques may be used in some circumstances. The transceiver nodes 102, 104 are eNodeB (evolved Node B) base stations for the example. The transceiver nodes, however, can be any type of base station, transceiver, access point, or wireless communication equipment that can perform the functions described herein. As discussed below with reference to FIG. 1B and FIG. 1C, the originating transceiver node 102 may be connected directly to the alternate transceiver node 104 and/or other transceiver nodes through a communication link that allows direct communication between the transceiver nodes. An example of such a direct communication link is a communication link that supports X2 messaging. In an example where a connection supporting direct communication between the transceiver nodes is not available, communication between the transceiver nodes 102, 104 is accomplished using S1 signaling through a core network 116, which typically includes a mobility management entity (MME) and other entities. In accordance with known techniques, the transceiver nodes communicate with the MME in the core network 116 using S1 Control messages.

The originating transceiver node 102 provides wireless service to one or more wireless communication devices 106 by transmitting downlink signals and receiving uplink signals. The downlink signals include a first pilot signal 108 having a first pilot signal frequency (F1). The wireless communication device 106 communicating with the originating transceiver node 102 transmits uplink signals 110 that are associated with the pilot signal 108 frequency. The uplink signal and downlink signal may have the same frequency or may have different frequencies that are paired to each other in accordance with the frequency band allocation of the system 100. The alternate transceiver node 104 provides service to wireless communication devices by using uplink signals and downlink signals having different frequencies than the originating transceiver node 102. The alternate transceiver node 104 transmits a second pilot signal 112 having a second pilot signal frequency (F2) different from the first pilot signal frequency (F1). The uplink signals received by the alternate transceiver node 104 are associated with the second pilot signal frequency during communication with a wireless communication device 106. The uplink signal and downlink signal transmitted by the alternate transceiver node 104 may have the same frequency or may have different frequencies that are paired in accordance with the frequency band allocation of the system. Accordingly, the alternate transceiver node 104 receives and searches for uplink signals having frequencies associated with the second pilot signal frequency in accordance with conventional techniques except that the alternate transceiver node 104 also searches for uplink signals having frequencies associated with the first pilot signal frequency at appropriate times. Since the wireless communication device 106 communicating with the originating transceiver node 102 is transmitting uplink signals at a frequency different than the frequencies searched by the alternate transceiver node 104, the alternate transceiver node 104 is not aware of the wireless communication device 106 unless notified. Further, unless the wireless communication device 106 searches for a pilot 112 signal having a second pilot signal frequency (F2), the wireless communication device 106 will not be aware of the alternate transceiver node 104.

The pilot signals 108, 112 may be continuously transmitted single frequency carrier signals or may be other dedicated channels that are transmitted at particular times. For example, a pilot signal may include one or more time slots at a particular frequency or frequency set. Accordingly, a pilot signal frequency refers to the particular carrier frequency used for transmitting the pilot at the dedicated time.

In order to facilitate efficient communications and handovers, the originating transceiver node 102 notifies the alternate transceiver node 104 of the wireless communication device 106 at appropriate times. In response, the alternate transceiver node 104 activates an uplink receiver 114 or otherwise tunes an uplink receiver 114 to search for uplink signals 110 associated with the first pilot signal frequency (F1). After detecting an uplink signal 110 transmitted by the wireless communication device 106, the alternate transceiver node 104 determines whether the wireless communication device 106 is, at least possibly, within range to receive service from the alternate transceiver node 104. If the alternate transceiver node 104 determines that the wireless communication device 106 is within range, the core network 116 is notified. The core network 116 consequently instructs the wireless communication device 106 to include the second pilot signal frequency in the list of pilot signals searched by the wireless communication device 106.

Therefore, for the example of FIG. 1A, the originating transceiver node 102 receives an uplink signal 110 from the wireless communication device 106 where the uplink signal 110 has an uplink frequency associated with a first pilot signal frequency. Based on location information pertaining to at least the location of the wireless communication device 106 and alternate transceiver nodes, the originating transceiver node 102 identifies one or more alternate transceiver nodes 104 that may be able to provide wireless service to the wireless communication device 106. The originating transceiver node 102 may also evaluate other information and parameters to identify alternate transceiver node candidates. As discussed below in further detail, for example, information regarding the pilot signals that can be received by the wireless communication device 106 can be evaluated to at least estimate the location of the wireless communication device 106. Other information that may be evaluated in some situations includes the size of service areas provided by the alternate transceiver nodes. After identifying at least one alternate transceiver node 104, the originating transceiver node 102 transmits a search message 118 to the alternate transceiver node 104. The search message 118 comprises information indicating that the wireless communication device 106 is transmitting uplink signals at the uplink frequency. The search message 118 may specifically indicate the uplink frequency, identify the wireless communication device 106, identify the first pilot signal frequency, and/or provide any information that can be used by the alternate transceiver node 104 to determine that a wireless communication device 106 is transmitting uplink signals associated with the first pilot signal frequency. The search message 118 includes any combination of parameters indicating uplink frequency, uplink transmission schedule parameters (frequency-time bins or Resource Blocks (RB used in LTE)), Mobile ID, and/or timing-offset parameters. In situations where the originating transceiver node 102 is connected to the alternate transceiver node 104 through a communication link that supports direct communication, the message is sent directly through the link. For example, if the communication link supports X2 messaging, the search message can be sent using an X2 message in accordance with 3GPP LTE protocol. If the communication link does not support direct communication between the transceiver nodes, the message can be sent through the core network 116. For example, the originating transceiver node 102 may transmit the search message 118 as an S1 message to the core network 116 which then transmits another S1 message including the search message 118, or at least information based on the search message 118, to the alternate transceiver node 104.

In some circumstances, the originating transceiver node 102 also sends a message to the wireless communication device 106 requesting that wireless change its format for uplink signals. By adjusting aspects of the uplink format, such as, for example, the cyclic prefix, guard times, and/or the access channel, pre-determined scheduled transmissions of the uplink signals can be formatted to be more easily detected by the alternate transceiver nodes. For the example of FIG. 1A, a change uplink format message 120 is transmitted to the wireless communication device 106 to adjust the uplink format. An example of a suitable technique for sending the message 120 includes sending an upper layer message, such as a layer 3 message.

In response to detecting the uplink signal 110, the alternate transceiver node 104 notifies the core network 116. The device proximity message 122 is sent to the core network 116 where the device proximity message 122 at least indicates that the uplink signals transmitted from the wireless communication device 106 has been detected. After receiving the uplink signal 110, the alternate transceiver node 104 may evaluate one or more parameters to determine if the core network 116 should be notified. The alternate transceiver node 104 may determine whether the wireless communication device 106 is sufficiently close to the alternate transceiver node 104 to receive wireless service before notifying the core network 116. For the examples discussed herein, the alternate transceiver node determines the proximity of the wireless communication device 106 to the alternate transceiver node and determines if the proximity is less than a threshold. If the proximity is less than the proximity threshold, the alternate transceiver node sends a device proximity message 122 to the core network 116. An example of a suitable method of determining the proximity is described in U.S. patent application Ser. No. 11/565,323 entitled "DETECTION OF A MULTI-MODE PORTABLE COMMUNICATION DEVICE AT A MESH NETWORK", filed on Nov. 30, 2006 and incorporated by reference in its entirety herein. The device proximity message 122 is sent using the S1 signaling to an MME in the core network 116 for the example. Other techniques may be used in some circumstances. The device proximity message 122 in the example is sent when the proximity is less than a threshold. The device proximity message 122 may provide proximity information in some circumstances where the information may be used by the MME (or other entities in the core network 116) to determine whether the wireless communication device 106 should search for the alternate transceiver node 104. The device proximity message 122 may also include other information such as, for example, characteristics of the received uplink signal.

In response to the device proximity message 122, the core network 116 determines whether the wireless communication device 106 should search for the second pilot signal 112 of the alternate transceiver node 104. The core network 116 sends an update transceiver node search message 124 to the wireless communication device 106 to change/update the pilot signals that are searched. An example of a suitable technique of sending the message 124 includes sending an S1 message to the originating transceiver node 102 which, in response, sends a message to the wireless communication device 106. In some circumstances, receipt of the device proximity message 122 at the core network 116 is sufficient to change the search scheme of the wireless communication device 106. The update transceiver node search message 124 may be a neighborhood list update message indicating an addition of the second pilot signal frequency to a neighborhood list where the neighborhood list identifies pilot signal frequencies that should be used by the wireless communication device 106 to search for alternate transceiver nodes.

Figure 1B:
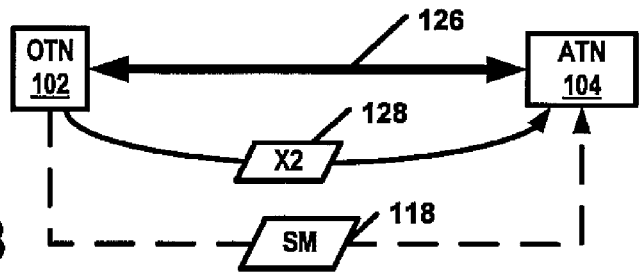
FIG. 1B is a block diagram of the wireless communication system that includes a direct communication link supporting direct communication between the originating transceiver node and the alternate transceiver node.

FIG. 1B is a block diagram of the wireless communication system 100 that includes a direct communication link 126 between the originating transceiver node 102 and the alternate transceiver node 104 that support direct communication between the transceiver nodes 102, 104. For the exemplary system 100 in FIG. 1B, the search message 118 is transmitted directly to the alternate transceiver node 104 through the direct communication link 126 by sending an X2 message 128. The X2 message 128 is generated and transmitted by the originating transceiver node 102 in accordance with the 3GPP LTE protocol. Other types of signaling may be used depending on the particular system 100 and protocols.

Figure 1C:
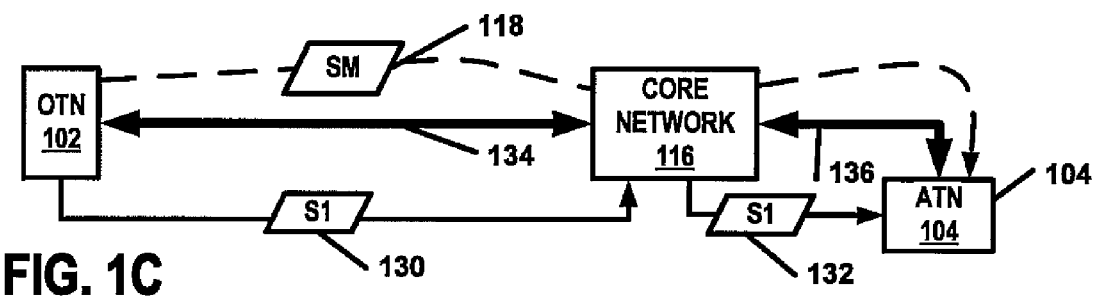
FIG. 1C is a block diagram of the wireless communication system where no direct communication link allowing direct communication between the transceiver nodes connects the originating transceiver node and the alternate transceiver node.

FIG. 1C is a block diagram of the wireless communication system 100 where no direct communication link connects the originating transceiver node 102 and the alternate transceiver node 104. Accordingly, the transceiver nodes 102, 104 are not able to communicate directly with each other. The search message 118 is sent to the alternate transceiver node 104 by sending an S1 message 130 to the core network 116 which then sends another S1 message 132 to the alternate transceiver node 104. The core network 116 is connected to the originating transceiver node 102 through a direct communication link 134 and to the alternate transceiver node 104 through another direct communication link 136 where the direct communication links 134, 136 support communication between core network 116 and each transceiver node 102, 104. For the example, therefore, the communication links 134, 136 support S1 messaging. For the example of FIG. 1C, the MME in the core network receives, processes, and transmits S1 messages.

Figure 2:
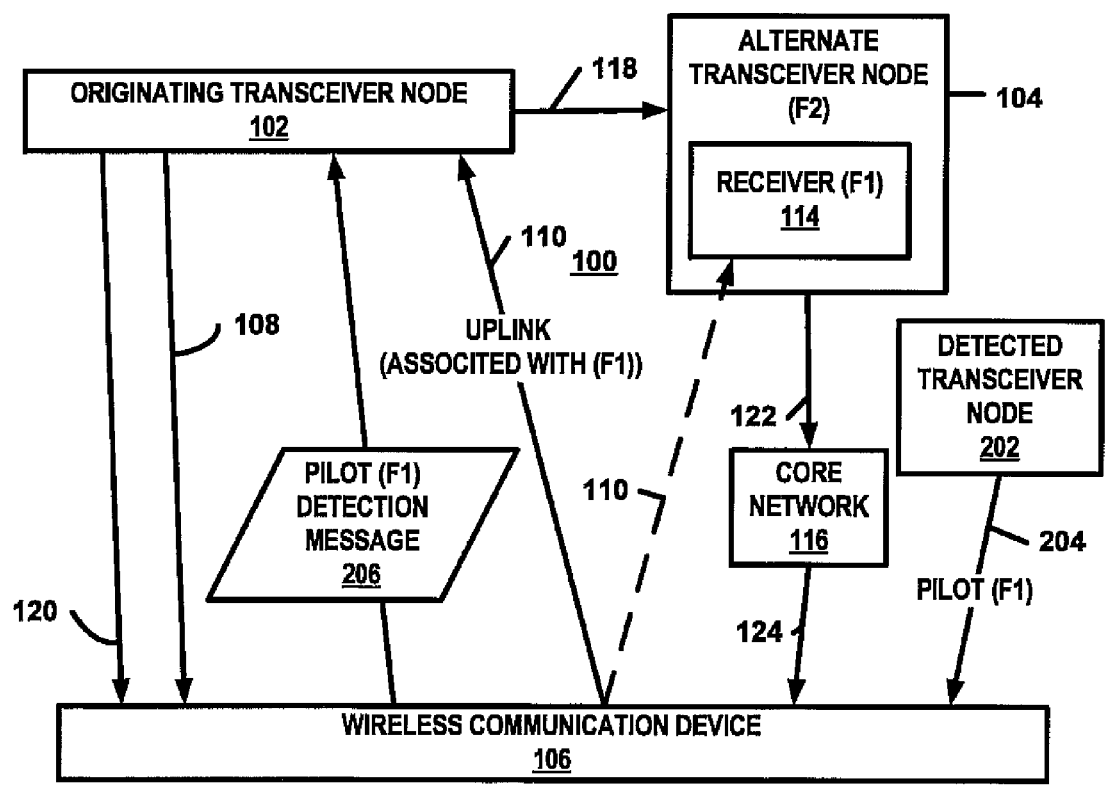
FIG. 2 is a block diagram of the communication system where the originating transceiver node determines whether to send the search message based on the pilot signals received at the wireless communication device.

FIG. 2 is a block diagram of the communication system 100 where the originating transceiver node 102 determines whether to send the search message 118 based on the pilot signals received at the wireless communication device 106. In addition to the originating transceiver node 102 and the alternate transceiver node 104, the system 100 of FIG. 1B also includes one or more detected transceiver nodes 202. For the example of FIG. 1B, the detected transceiver node is an eNodeB operating in accordance with the same 3GPP LTE protocol as the other transceiver nodes 102, 104 in the system 100.

The detected transceiver node 202 may be any other transceiver node that is transmitting a pilot signal 204 that have frequency being searched by the wireless communication device 106. For the example, the pilot signal 204 has the same frequency (F1) as the frequency (F1) of the pilot signal 108 transmitted by the originating transceiver node 102.

The wireless communication device 106 searches for pilot signals while communicating with the originating transceiver node 102 and reports pilot signal strengths to the originating transceiver node. Based on the pilot signal strength and other information, the originating transceiver node 102 determines whether an alternate transceiver node operating at a frequency (F2) other than the frequency (F1) of the originating transceiver node 102 may be able to provide service to the wireless communication device 106. The originating transceiver node 102 informs one or more alternate transceiver nodes of the wireless communication device 106. As discussed above, the originating transceiver node 102 may communicate directly with the alternate transceiver node 104 or may inform the alternate transceiver node 104 through the core network 116 such as through a mobility management entity (MME). In response to the information provided by the originating transceiver node 102, the alternate transceiver node 104 searches for uplink signals transmitted by the wireless communication device 106. Received uplink signals are evaluated to determine the proximity of the wireless communication device 106 to the alternate transceiver node 104. If the proximity is less than a threshold, the alternate transceiver node 104 reports detection of the wireless communication device 106 to the core network which, in response, informs the wireless communication device 106 of at least the possibility of available service from the alternate transceiver node 104. The wireless communication device 106 then adjusts the search scheme to search for the alternate transceiver node 104.

The search for pilot signals performed by the wireless communication device 106 may be periodic, continuous, or occasional. Typically, the wireless communication device 106 executes a searching scheme that searches for pilot signals within a neighborhood list which is stored in memory and may be updated at certain times. The wireless communication device 106 records signal strength and/or other parameters related to the quality of the pilot signals that are detected. A pilot signal report is sent to the originating transceiver node 102. For the example of FIG. 2, a pilot detection message 206 is transmitted by the wireless communication device 106 where the pilot detection message 206 at least identifies the pilot signal 204 transmitted by the detected transceiver node 202 and detected at the wireless communication device 106. The message 206 may include other information such as signal strength and time offsets and may include information regarding multiple detected pilot signals. The originating transceiver node 102 evaluates the pilot signal report provided by the pilot detection message 206 and determines whether the wireless communication device 106 may be near an alternate transceiver node 104 and at least potentially be able to receive wireless service from the alternate transceiver node 104. As discussed below with reference to FIG. 3, for example, the originating transceiver node 102 may determine that the wireless communication device is near an alternate transceiver node 104 that is positioned on a cell boundary between the originating cell and a detected cell of a detected transceiver node 202 when the wireless communication device 106 reports a pilot signal with a high signal strength from a detected transceiver node 202. Based on the determination, the originating transceiver node 102 informs at least one alternate transceiver node 104 on the cell boundary that the wireless communication device 106 may be near the alternate transceiver node 104. For the example, the originating transceiver node 102 informs the alternate transceiver node 104 of the wireless communication device 106 by sending a search message.

In response to the search message 118, the alternate transceiver node 104 tunes or otherwise activates a receiver to search for uplink signals transmitted for the wireless communication device 106. The alternate transceiver node 104 applies the information received in the search message to determine the uplink signal frequency used by the wireless communication device 106. As mentioned above, the search message may directly indicate the uplink frequency or may include a parameter that allows the alternate transceiver node 104. For example, an indication of the pilot frequency of the originating transceiver node 102 may indicate the uplink signal frequency where the uplink and downlink frequencies are paired. Accordingly, the originating transceiver node 102 receives, from the wireless communication device 106, a pilot detection message 206 indicating that the wireless communication device 106 has detected a transceiver node pilot signal 204 having the first pilot signal frequency. The originating transceiver node 102 at least estimates a wireless communication device 106 location based on the pilot signal report message. The location is compared to known alternate transceiver node locations. The search message is sent to alternate transceiver nodes identified as candidates for providing wireless service to the wireless communication device 106.

Figure 3:
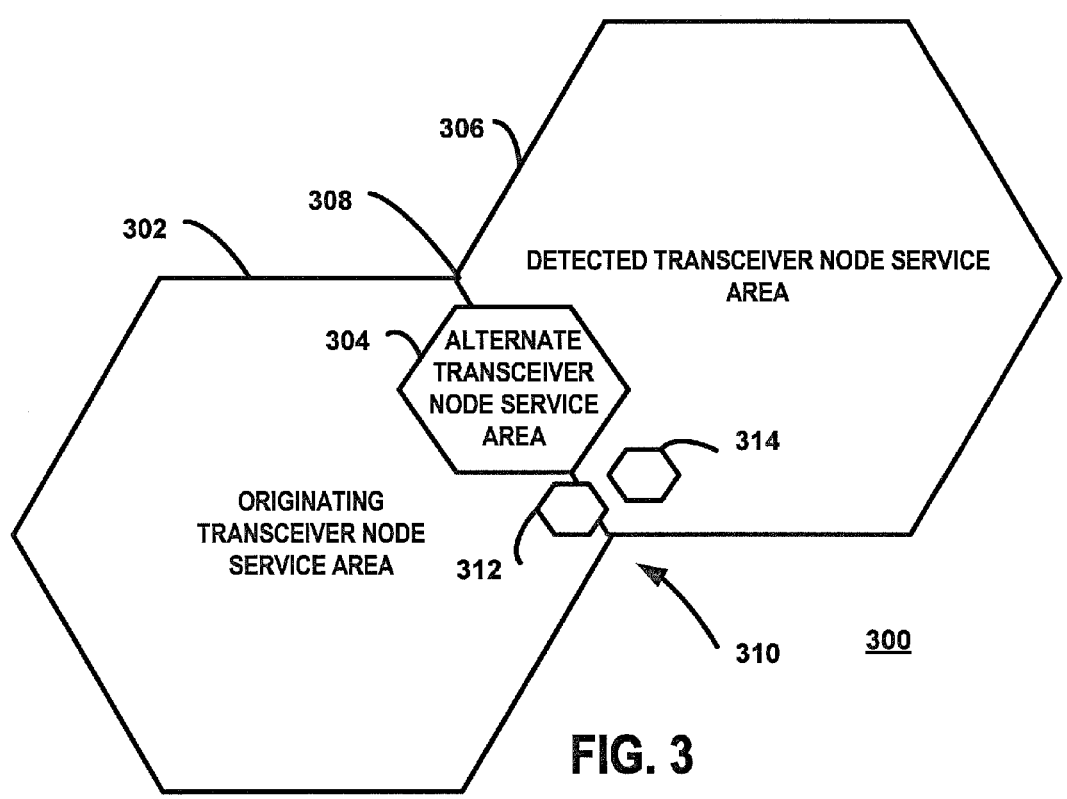
FIG. 3 is an illustration of an arrangement of an exemplary geographical service area relationship provided by the originating transceiver node, the alternate transceiver node and the detected transceiver node.

FIG. 3 is an illustration of an arrangement of an exemplary geographical service area relationship 300 provided by the originating transceiver node 102, the alternate transceiver node 104 and the detected transceiver node 202. An originating transceiver node 102 geographical service area (originating service area) 302 is provided by the originating transceiver node 102. An alternate transceiver node geographical service area (alternate service area) 304 is provided by the alternate transceiver node 104. A detected transceiver node geographical service area (detected service area) 306 is provided by the detected transceiver node 202. The alternate service area 304 may be one of a plurality of alternate service areas 310 that are positioned on or near a boundary 308 between the originating service area 302 and the detected service area 306. The plurality of alternate service areas 310 may include a service area 312 that overlaps the service areas 302, 306 and/or may include a service area 314 that is within one of the service areas 302, 306.

The service areas 302, 304, 306, 312, 314 may have any of several shapes, sizes, and configurations. Accordingly, the hexagons representing the service areas generally illustrate the relationships between the service areas and do not necessarily depict the actual shapes of the service areas. Further, the service areas may contain holes of coverage where service is unavailable. In the interest of clarity and brevity, such features are not illustrated in the FIG. 3. The exemplary arrangement shown in the figure corresponds to a hierarchical cell system where the alternate service areas 304 (310) are provided by small cell base stations (eNodeBs) that are smaller than the larger service areas provided by larger cell base stations (eNodeBs). For example, the originating transceiver node 102 and the detected transceiver node 202 may be macrocell eNodeBs and the alternate transceiver nodes may be microcell, picocell, or femtocell eNodeBs.

Where the alternate service areas are femtocells, a femtocell eNodeB or base station (transceiver node 104) may be located at a residence where the femtocell is a service area for devices used by device users living at the residence. When the wireless communication devices are outside the service area 304, service is provided by larger macrocells (302, 306). When the authorized wireless communication device 106 is at the residence, however, service is provided by the transceiver node 104 presenting the smaller femtocell service area 304. In some situations, the service area 304 of the alternate transceiver node 104 will be completely within a larger service area. In other situations, however, the service area 304 may be partially overlapping with the service areas 302, 306 as shown in FIG. 3 or may be non-overlapping but adjacent to the service area.

Figure 4:
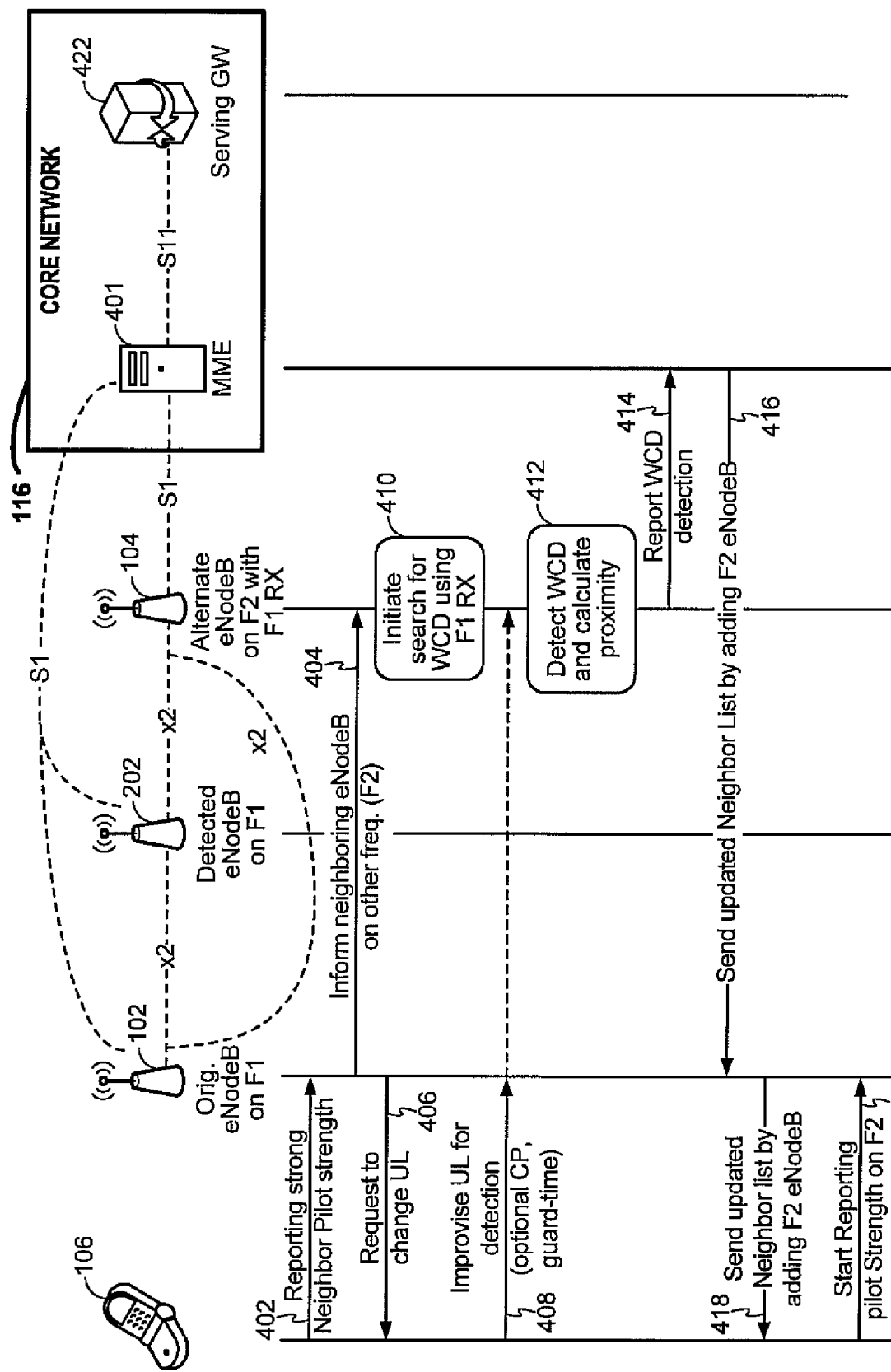
FIG. 4 is a signaling diagram showing an exemplary communication sequence within the wireless communication system.

FIG. 4 is a signaling diagram showing an exemplary communication within the wireless communication system 100. For the example of FIG. 4, the transceiver nodes 102, 104, 202 are eNodeBs operating in accordance 3GPP LTE standards. The core network 116 includes an MME 401 for the example.

At event 402, the wireless communication device 106 reports a strong neighbor pilot signal. A pilot detection message 206, such a pilot signal report, is transmitted from the wireless communication device 106 to the originating transceiver node 102.

At event 404, the neighboring eNodeB (alternate transceiver node 104) operating at frequency F2 is informed of the pilot signal report. The search message 118 is sent from the originating transceiver node 102 to the alternate transceiver node 104. The search message includes information that allows the alternate transceiver node 104 to determine uplink frequency used by the wireless communication device 106 that may be within the service area of the alternate transceiver node 104. Accordingly, the search message is a request to the neighboring eNodeB to initiate a search for the uplink signal associated with the first pilot signal frequency F1.

At event 406, a request is made to change the uplink format of the wireless communication device 106. A change uplink format request message 120 is sent to the wireless communication device 106 using an upper layer of the communication protocol.

At event 408, the uplink format of the uplink signals transmitted by the wireless communication device 106 is adjusted to increase the ability of the alternate transceiver node 104 to detect the uplink signals. Changes to the cyclic prefix, guard times, and/or transmission of access channels allow the uplink signal to be more easily detected by a receiver. Examples of other changes in the uplink format include adjustments in transmission power, adjustments to the number of time slots and/or frequency slots and adjustments to the coding rate. Other adjustments may also be applied. Accordingly, the change in uplink format is any single parameter change or combination of adjustments that increase the likelihood of an alternate transceiver node receiving the uplink signal. In some situations, event 408 may be omitted.

At event 410, the alternate transceiver node 104 initiates a search for the wireless communication device 106 using a receiver tuned to the uplink frequency associated with the first pilot signal frequency. As described above, the uplink frequency may be the same frequency as the first pilot signal frequency or may be an uplink signal frequency that is paired with the pilot frequency depending on whether the system employs FDD or TDD techniques. The uplink signal transmission of the wireless communication device 106 could be an access channel transmission, a traffic channel signal, and/or an idle state uplink transmission.

At event 412, the wireless communication device 106 is detected by the alternate transceiver node 104 and the proximity is calculated. The receiver 114 in the alternate transceiver node 104 receives the uplink signal 110 transmitted by the wireless communication device 106. The proximity of the wireless communication device 106 to the alternate transceiver node 104 is calculated based on characteristics of the received signal. As mentioned above, an example of a suitable method of determining the proximity is provided in U.S. application Ser. No. 11/565,323.

At event 414, the detection of the wireless communication device 106 is reported to the MME 401 in the core network 116. For the example, the detection is only reported if the proximity is less than a proximity threshold. Accordingly, the device proximity message 122 is transmitted based on the proximity calculation for the example.

At event 416, the MME 401 sends a control signal to the originating transceiver node 102 to update the search list of the wireless communication device 106 to include the alternate transceiver node 104. Examples of information that may be sent by the control signaling include an updated neighborhood list, an eNodeB Identifier, a frequency indicator, and or band-class identifier.

At event 418, the wireless communication device 106 is informed of the new frequency (F2). For the example, an updated neighborhood list is sent to the wireless communication device 106. The wireless communication device 106 monitors neighborhood list information in overhead messages and applies any indicated updates.

At event 420, the wireless communication device 106 begins reporting the signal strength of pilot signals having the second pilot signal frequency (F2). Since the search scheme include (F2) as a result of the neighbor list update, the wireless communication device 106 includes (F2) in the search scheme.

Figure 5:
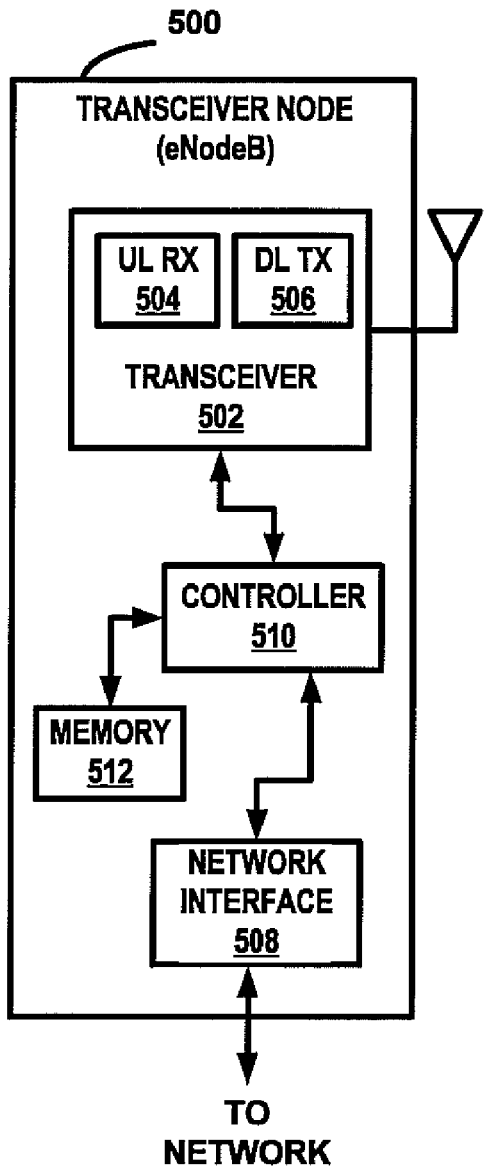
FIG. 5 is a block diagram of a transceiver node suitable for use as the originating transceiver node and the detected transceiver node.

FIG. 5 is a block diagram of a transceiver node 500 suitable for use as the originating transceiver node 102 and the detected transceiver node 202. The transceiver node 500 may be any combination of electronics including hardware, software, and/or firmware to perform the described functional blocks. The various functions and operations of the blocks described with reference to the transceiver node 500 may be implemented in any number of devices, circuits, or elements. Two or more of the functional blocks may be integrated in a single device and the functions described as performed in any single device may be implemented over several devices. For example, at least portions of the functions of the transceiver may be performed by the controller. The controller may include a separate memory in some circumstances.

A transceiver 502 is configured to exchange wireless signals with one or more wireless communication devices (106) and includes a receiver 504 for receiving uplink signals and a transmitter 506 for transmitting downlink signals. As described above, the downlink signal frequency used for a particular wireless communication device 106 may be the same as the uplink frequency where TDD techniques are used. Where FDD techniques are employed, the particular downlink frequency is paired with the uplink frequency for the particular communication device. The pilot signal is transmitted at a downlink frequency which, for the examples, is the first pilot signal frequency (F1). A network interface 508 is connected to the system infrastructure and facilitates communication with other transceiver nodes and/or the core network 116. A controller 510 is any processor, microprocessor, processor arrangement, or computer that can execute code to perform the functions described herein and to facilitate the overall operation of the transceiver node 500. The memory 512 may be any combination of persistent and temporary memory suitable to store information and data.

Figure 6:
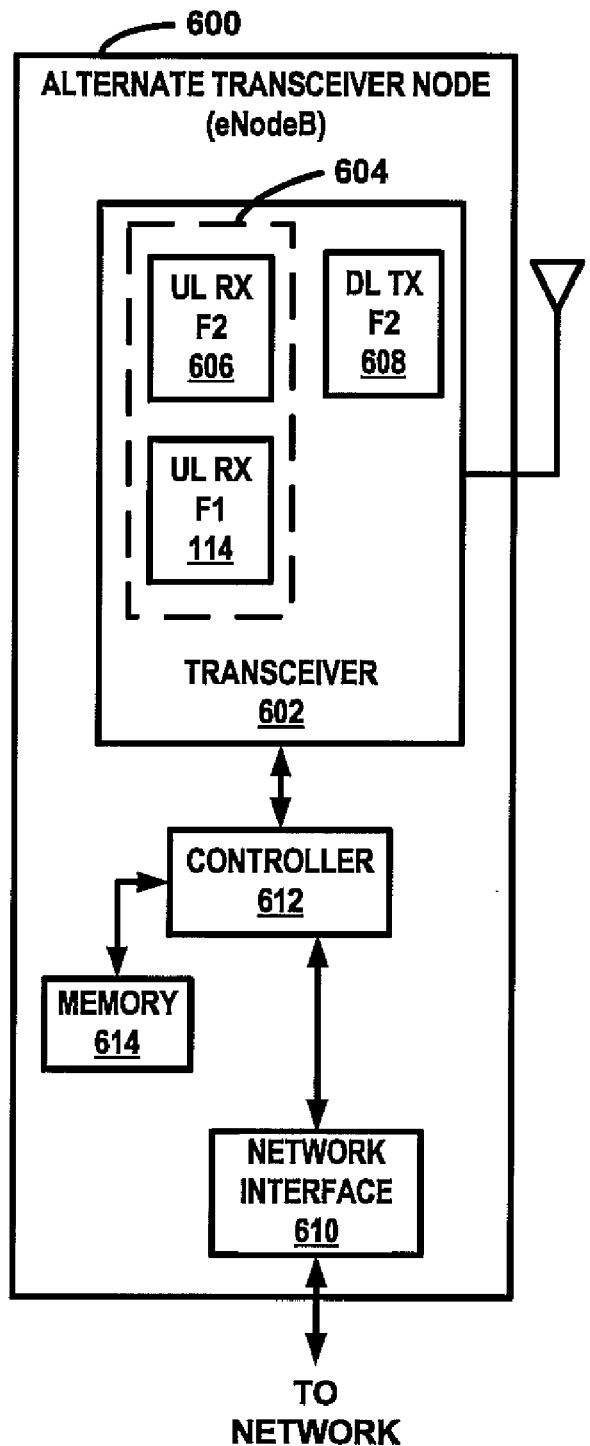
FIG. 6 is block diagram of a transceiver node suitable for use as the alternate transceiver node.

FIG. 6 is block diagram of a transceiver node 600 suitable for use as the alternate transceiver node 104. The transceiver node 600 may be any combination of electronics including hardware, software, and/or firmware to perform the described functional blocks. The various functions and operations of the blocks described with reference to the transceiver node 600 may be implemented in any number of devices, circuits, or elements. Two or more of the functional blocks may be integrated in a single device and the functions described as performed in any single device may be implemented over several devices. For example, at least portions of the functions of the transceiver may be performed by the controller. The controller may include a separate memory in some circumstances.

A transceiver 602 is configured to exchange wireless signals with one or more wireless communication devices (106) and includes a receiver 604 for receiving uplink signals and a transmitter 608 for transmitting downlink signals. The receiver 604 is capable of receiving uplink signals on two different frequencies and, therefore, can be considered as a single device with such capability or may be a device that includes two uplink receivers. For the example, the transceiver 602 includes two uplink receivers where the first frequency receiver 114 can receive uplink signals transmitted at the uplink frequency associated with the first pilot signal frequency and the second frequency receiver 606 is configured to receive uplink signals at frequencies associated with the second pilot signal frequency. The downlink transmitter 608 transmits a pilot signal 112 having the second pilot signal frequency (F2). When providing wireless service, the transceiver node 600 receives and transmits signals at frequencies associated with the second pilot signal frequency (F2). Accordingly, the second frequency receiver 606 is used for receiving uplink signals from wireless communication devices communicating with the transceiver node 600. The first frequency receiver 114 monitors the uplink frequencies used by wireless communication devices communicating with transceiver nodes that are transmitting pilot signals having the first pilot signal frequency, such as the originating transceiver node 102.

A network interface 610 is connected to the system infrastructure and facilitates communication with other transceiver nodes and/or the core network 116. The controller 612 is any processor, microprocessor, processor arrangement, or computer that can execute code to perform the functions described herein and to facilitate the overall operation of the transceiver node 600. The memory 614 may be any combination of persistent and temporary memory suitable to store information and data.

Figure 7:
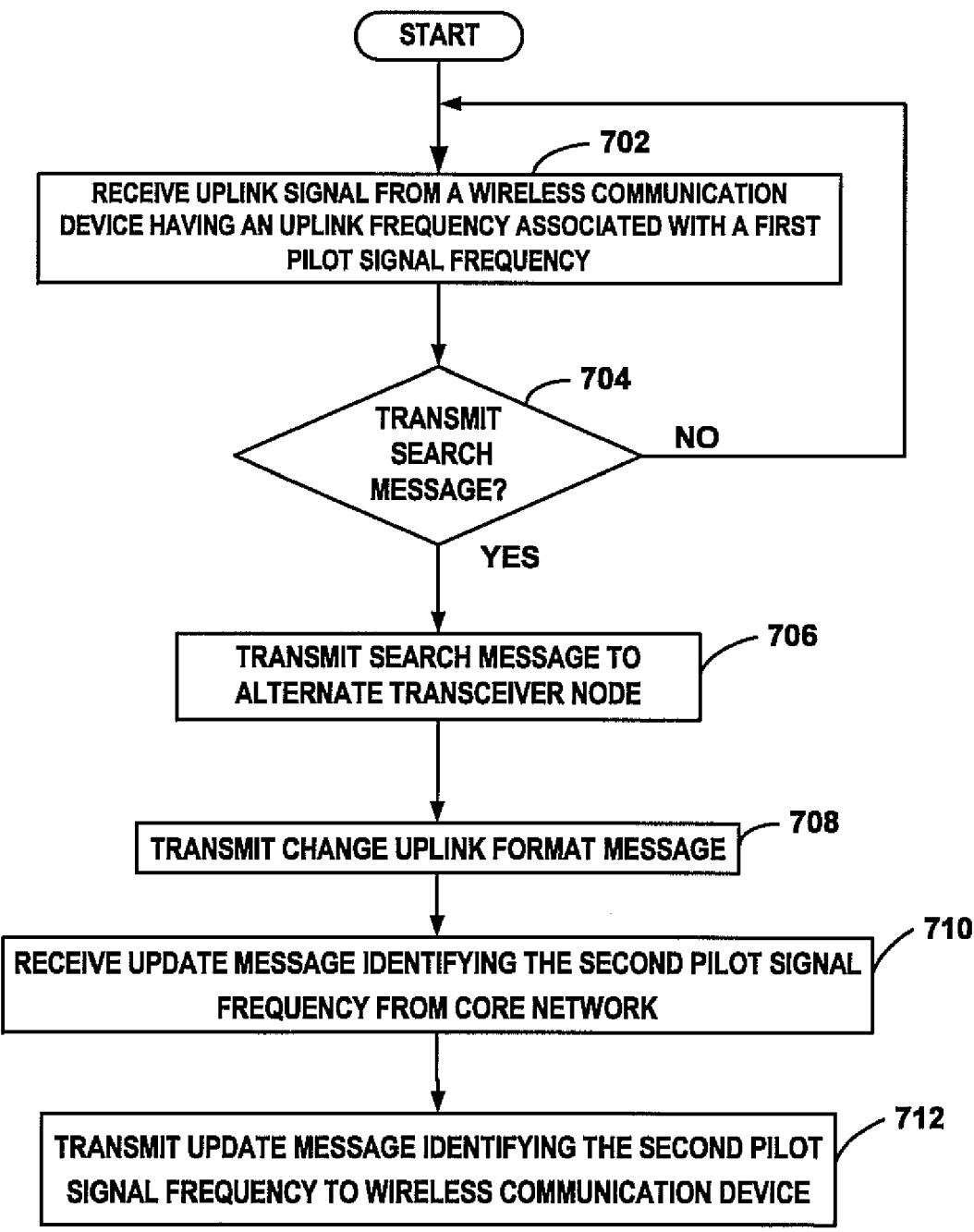
FIG. 7 is flow chart of a method performed at an originating transceiver node.

FIG. 7 is flow chart of a method performed at an originating transceiver node 102. The method may be performed by any combination of software, firmware, and hardware. In some circumstances, the steps described in the flow chart may be performed in a different order than shown and two or more steps may be combined in a single step.

At step 702, the uplink signal is received at the originating transceiver node 102 from the wireless communication device 106 where the frequency of the uplink signal is associated with the first pilot signal frequency. The originating transceiver node 102 is transmitting a pilot signal with the first pilot signal frequency and providing service to one or more wireless communication devices. The wireless communication devices transmit uplink signals assigned to corresponding pilot signal frequency.

At step 704, the originating transceiver node 102 determines whether to transmit a search message to an alternate transceiver node 104. As described above, the location of the wireless communication device 106 is evaluated to determine whether an alternate transceiver node may be in the vicinity of the wireless communication device 106 and able to provide service. In some circumstances, the location of the wireless communication device 106 is determined based on the GPS information or triangulation techniques. The location may be reported by the wireless communication device 106, at least partially calculated by the originating transceiver node 102, and/or at least partially calculated by a position determining entity (PDE). In one example, the wireless communication device 106 informs the originating transceiver node 102 that a pilot signal from another transceiver node (detected transceiver node 202) has been detected. Such a notification may be performed by sending a pilot signal strength report from the wireless communication device 106. Based on the location of the detected transceiver node 202, the originating transceiver node 102 at least estimates the location of the wireless communication device 106 and identifies alternate transceiver nodes 104 (110) in the vicinity. Since the alternate transceiver nodes may be transmitting pilot signals with frequencies that are not being searched by the wireless communication device 106, the alternate transceiver nodes are not detected by the wireless communication device 106 even though the device 106 is within the geographical service area of the alternate transceiver node 104. For the example, the alternate transceiver node 104 transmits a pilot signal with a second pilot signal frequency (F2) and the originating transceiver node 102 and the detected transceiver node transmit pilot signals having the first pilot signal frequency. If it is determined that a search message should be sent, the method continues at step 706. Otherwise the method returns to step 702.

At step 706, the search message 118 is transmitted to the alternate transceiver node 104. As described above, the search message 118 includes information that allows the alternate transceiver node 104 to identify the uplink frequency used by the wireless communication device 106. The search message may be an X2 signal in accordance with a 3rd Generation Partnership Project (3GPP) Long Term Evolution (LTE) standard transmitted through a communication link between the originating transceiver node 102 and the alternate transceiver node 104. Where the originating transceiver node 102 and the alternate transceiver node 104 are not directly connected the search message may be an S1 signal in accordance with 3GPP LTE standards transmitted through a communication link between the originating transceiver node 102 and a mobility management entity (MME) to invoke transmission of another S1 message from the MME to the alternate transceiver node.

At step 708, a change uplink format message 120 is transmitted to the wireless communication device 106. As described above, the message 120 requests that the wireless communication device 106 change the format of the uplink signals that allows the uplink signals to be more easily detected. Step 708 may be performed before step 706 or omitted in some circumstances.

At step 710, an update transceiver node search message 124 is received from the core network 116. The update message 124 is any message that includes information to modify the search scheme of the wireless communication device 106 to include searching for the pilot signal of the alternate transceiver node 104.

At step 712, the update message 124 identifying the pilot signal of the alternate transceiver node 104 is forwarded to the wireless communication device 106. The update message 124 is not necessarily the same message as the message sent from the core network 116. The message 124 sent from the wireless communication device 106 is in accordance with the message sent by the core network 116.

Figure 8:
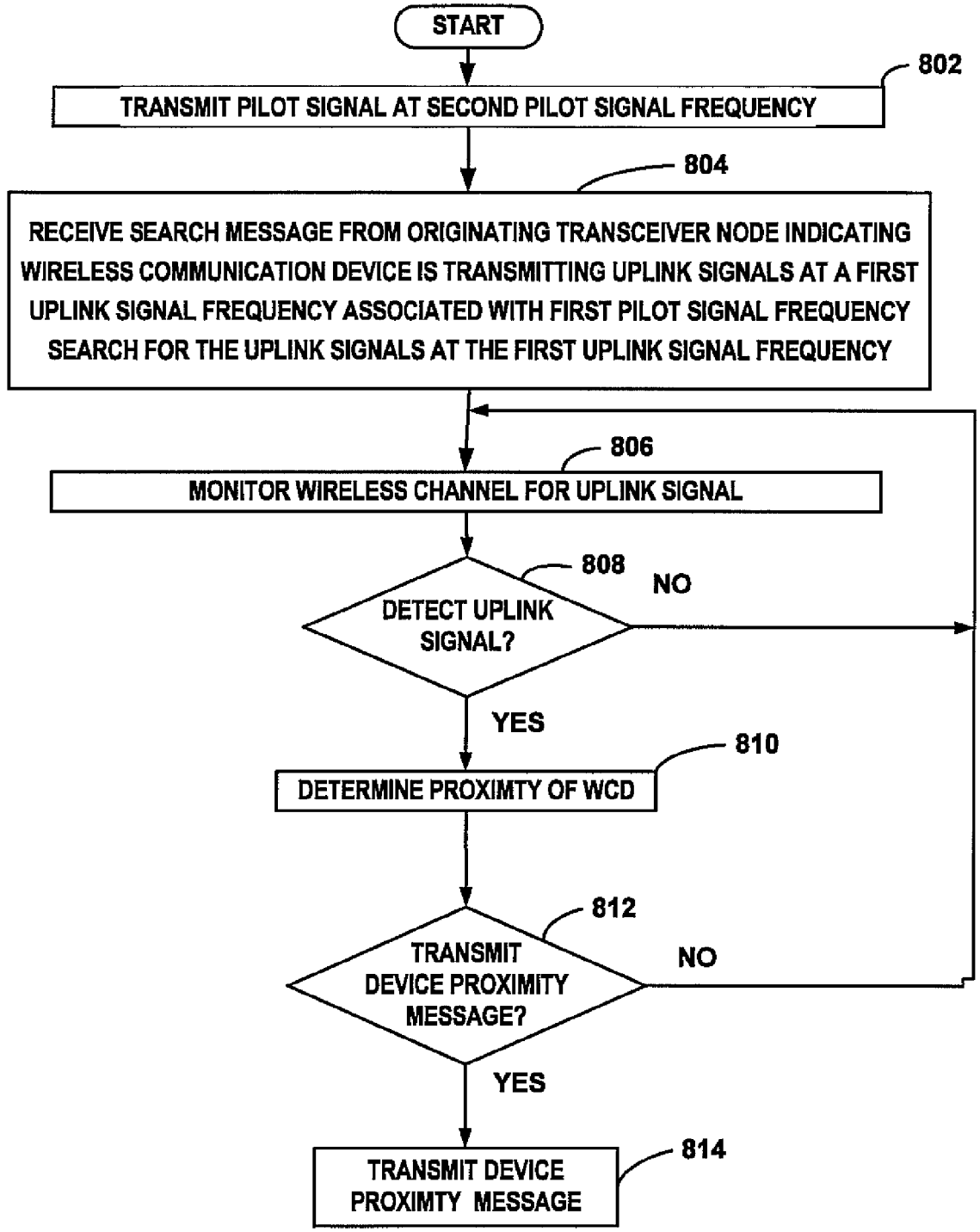
FIG. 8 is flow chart of a method performed at an alternate transceiver node.

FIG. 8 is flow chart of a method performed at an alternate transceiver node 104. The method may be performed by any combination of software, firmware, and/or hardware. In some circumstances, the steps described in the flow chart may be performed in a different order than shown and two or more steps may be combined in a single step.

At step 802, the alternate transceiver node 104 transmits a pilot signal at the second pilot signal frequency (F2) different from the first pilot signal frequency (F1).

At step 804, the search message 118 is received from the originating transceiver node 102 which is transmitting a pilot signal at (F1) and communicating with the wireless communication device 106.

At step 806, the wireless channel is monitored for the uplink signal associated with the first pilot signal frequency (F1). The information included in the search message 118 is evaluated to determine the uplink channel that should be monitored. The uplink receiver is tuned to the uplink signal frequency. As described above, a separate receiver 114 from the receiver 606 may be used to receive the uplink signals associated with (F1) or a single receiver 604 may be used to receive both uplink signal frequencies.

At step 808, it is determined whether an uplink signal transmitted from the wireless communication device 106 has been detected. If the uplink signal has been detected, the method continues at step 810. Otherwise, the method returns to step 806 to continue monitoring the wireless channel.

At step 810, the proximity of the wireless communication device 106 to the alternate transceiver node 104 is determined. Characteristics of the received uplink signal 110 are evaluated and the proximity is at least estimated.

At step 812, it is determined whether a device proximity message 122 should be sent to the core network 116. Any of numerous criteria may be applied to determine whether the message 122 should be sent. For the example, estimated or calculated proximity is compared to a proximity threshold. If the proximity is less than the threshold, it is determined that the device proximity message 122 should be sent. The method proceeds to step 814 if the message 122 is to be sent. Otherwise, the method returns the step 806.

At step 814, the device proximity message 122 is sent to the core network 116. In response, the core network 116 transmits the update message 124 to the wireless communication device 106 through the originating transceiver node 102.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   receiving, at an originating transceiver node, an uplink signal from a wireless communication device, the uplink signal having an uplink frequency associated with a first pilot signal frequency;
   transmitting, to an alternate transceiver node, a search message comprising information indicating that the wireless communication device is transmitting uplink signals at the uplink frequency; and
   in response to receiving the uplink signal at the originating transceiver node, transmitting a change uplink format message to the wireless communication device to invoke a change in an uplink signal format of future uplink signals transmitted by the wireless communication device to increase a likelihood of detection of the future uplink signals by the alternate transceiver node.

2. The method of claim 1, wherein the alternate transceiver node is transmitting a pilot signal having a second pilot signal frequency different than the first pilot signal frequency.

3. The method of claim 2, wherein transmitting the search message comprises transmitting the search message to invoke the alternate transceiver node to search for uplink signals at the uplink frequency.

4. The method of claim 1, further comprising:
   receiving, from a core network, an update message identifying the second pilot signal frequency;
   transmitting, to the wireless communication device, the update message.

5. The method of claim 4, wherein the update message is a neighborhood list update message indicating an addition of the second pilot signal frequency to a neighborhood list identifying pilot signal frequencies that should be used by the wireless communication device to search for alternate transceiver nodes.

6. The method of claim 1, further comprising:
   determining that there is at least a minimum likelihood that the wireless communication device is within a maximum proximity of the alternate transceiver node, where the transmitting the search message is in response to the determining.

7. The method of claim 6, wherein the determining comprises:
   comparing location information received from the wireless communication device to a location of the alternate transceiver node.

8. The method of claim 6, further comprising:
receiving, from the wireless communication device, a pilot signal report message indicating that the wireless communication device has detected a detected transceiver node pilot signal having the first pilot signal frequency transmitted from a detected transceiver node, wherein the determining comprises:
at least estimating a wireless communication device location based on the pilot signal report message; and
and comparing the wireless communication device location to an alternate transceiver node location.

9. The method of claim 1, further comprising:
identifying, at the originating transceiver node, the alternate transceiver node as being able to provide wireless service to the wireless communication device.

10. The method of claim 1, wherein the change uplink format message includes uplink information related to at least one of cyclic prefix, guard time, and an access channel.

* * * * *